United States Patent [19]

Morishita et al.

[11] 4,320,039

[45] Mar. 16, 1982

[54] HEAT-SENSITIVE RECORDING COMPOSITION WITH IMPROVED IMAGE STABILITY

[75] Inventors: Sadao Morishita, Ibaraki; Fumio Okumura, Kunitachi; Masahiro Higuchi; Masahiro Miyauchi, both of Tokyo; Syun Kamei, Kitamoto, all of Japan

[73] Assignee: Mitsubishi Paper Mills, Ltd., Tokyo, Japan

[21] Appl. No.: 200,584

[22] Filed: Oct. 24, 1980

[30] Foreign Application Priority Data

Oct. 29, 1979 [JP] Japan ................................ 54-139494

[51] Int. Cl.³ ...................... C08L 93/00; C09D 11/00; G03C 1/52

[52] U.S. Cl. ................................ 525/54.42; 430/338; 430/340; 430/336; 106/21; 428/913; 282/27.5; 525/382; 524/230; 524/227

[58] Field of Search .................. 106/21; 430/340, 336, 430/338; 428/DIG. 913; 260/DIG. 38, 25, 15; 282/27.5

[56] References Cited

U.S. PATENT DOCUMENTS 4,218,504 8/1980 Yamato et al. ........................ 106/21
4,226,912 10/1980 Iwasaki et al. ........................ 106/21

FOREIGN PATENT DOCUMENTS 53-17347 2/1978 Japan .................................... 106/21

*Primary Examiner*—Won H. Louie, Jr.
*Attorney, Agent, or Firm*—Cushman, Darby & Cushman

[57] ABSTRACT

A heat-sensitive recording composition with an improved image stability comprises 3-(N-methylcyclohexylamino)-6-methyl-7-anilinofluorane, 4,4'-isopropylidenediphenol capable of color-developing the fluorane through reaction by heating, fatty acid amide as a sensitizer and water-insoluble modified phenol resin having a softening point of 80° to 190° C., where at least 20% by weight of N-monosubstituted fatty acid amide is contained on the basis of total fatty acid amide, and 5 to 50% by weight of the water-insoluble, modified phenol resin is contained on the basis of the 4,4'-isopropylidenediphenol.

3 Claims, No Drawings

HEAT-SENSITIVE RECORDING COMPOSITION WITH IMPROVED IMAGE STABILITY

This invention relates to a heat-sensitive recording composition, and more particularly to a heat-sensitive recording composition which comprises 3-(N-methylcyclohexylamino)-6-methyl-7-anilinofluorane as a color former, 4,4′-isopropylidenediphenol as a developer, which will be hereinafter referred to as "bisphenol A", and a fatty acid amide as a sensitizer, wherein at least 20% by weight of N-monosubstituted fatty acid amide is contained on the basis of total fatty acid amide and 5 to 50% by weight of water-insoluble, modified phenol resin having a softening point of 80° to 190° C. is contained on the basis of bisphenol to improve the stability of image without impairing other characteristics.

A heat-sensitive recording composition comprising a lactone compound (color former) such as crystal violet lactone and a phenol compound (developer) capable of color-developing the lactone compound through reaction by heating is well known (Japanese Patent Publication No. 14039/70).

It is also well known to use fatty acid amide as a sensitizer to improve the sensitivity of a heat-sensitive recording composition.

This kind of heat-sensitive recording composition is widely used in recorders, printers, facsimiles, etc. However, particularly in facsimiles, high speed recording has been recently studied to reduce communication cost, etc., and heat-sensitive recording composition with a high sensitivity has been in demand. In this connection, fatty acid amide with a lower melting point has been used as the sensitizer, and stearamide has been widely used in view of other desired characteristics (for example, whiteness of sheet surface).

Characteristics required for this kind of heat-sensitive recording composition include sensitivity meeting the desired application, whiteness of sheet surface, prolonged stability and maintenance of developed image, no formation of unclean matter at the recording, no sticking to a hot head at the recording, less wear of a hot head, etc., but a heat-sensitive recording composition, which can meet all of these requirements, has not been known yet.

Heat-sensitive recording composition with most possible desired characteristics can be prepared from 3-(N-methylcyclohexylamino)-6-methyl-7-anilinofluorane as a color former and bisphenol A as a developer, as used in the present invention, but still have such a disadvantage that white powder is formed on image parts contacted with fingers, etc., which will be hereinafter referred to as "powder generation", and makes the images unclear through covering the images. As a result of analysis of the powder, it has been found that the powder generation is ascribed to recrystallization of bisphenol A.

The present inventors have made extensive studies of preventing the powder generation and have found the following new facts:

(1) Powder is less generated with N-monosubstituted fatty acid amide having one substituent as a sensitizer, for example, N,N′-ethylenebisstearamide, N,N′-methylenebisstearamide and N-methylolstearamide than with non-substituted fatty acid amide, for example, stearic acid amide, and when stearic acid amide is used for a higher sensitivity, powder generation can be reduced by using N-monosubstituted fatty acid amide at the same time according to the desired sensitivity.

(2) As a result of studying the art disclosed in Japanese Laid-open Patent Application Specification No. 17347/78 filed by the same Applicants as those of the present invention, that is, "use of water-insoluble, modified phenol resin having a softening point of 80° to 190° C. for improving a prolonged stability of image", a better effect can be obtained with rosin-modified phenol resin among other species of the modified phenol resin, but the effect is not better when stearic acid amide is used together, and also a large amount of rosin-modified phenol resin cannot be used, because of sticking and formation of unclear matter.

Furthermore, it has been found that a satisfactory effect can be obtained not by individual, independent use of the foregoing new facts (1) and (2), but by a combined use of the facts (1) and (2). That is, it has been found that it is essential that at least 20% by weight of N-substituted fatty acid amide is contained on the basis of total fatty acid amide for preventing powder generation and that 5 to 50% by weight of modified phenol resin is contained on the basis of bisphenol A for preventing sticking and formation of unclear matter.

The present invention is based on finding of these facts.

This kind of heat-sensitive recording composition has such a disadvantage, though there is a difference in its degree, that, by contact of developed images with fingers or hand with hand cream or hair oil thereon, the images are faded away, and it has been found that the present invention can considerably improve the disadvantage. This is another effect of the present invention.

Examples of fatty acid amide to be used in the present invention include:

(a) non-substituted fatty acid amide: caproic acid amide, caprylic acid amide, capric acid amide, lauric acid amide, myristic acid amide, palmitic acid amide, stearic acid amide, behenic acid amide, eicosenic acid amide, erucic acid amide, elaidic acid amide, oleic acid amide; etc.

(b) N-monosubstituted fatty acid amide: N,N′-methylenebislauric acid amide, N,N′-methylenebispalmitic acid amide, N,N′-methylenebisstearic acid amide, N,N′-methylenebisoleic acid amide, N,N′-methylenebiscaprylic acid amide, N,N′-ethylenebisstearic acid amide, N,N′-ethylenebisoleic acid amide, N-methylolstearic acid amide, ethoxy fatty acid amides prepared by adding ethylene oxide to fatty acid amides, etc.

The water-insoluble, modified phenol resin having a softening point of 80° to 190° C. to be used in the present invention includes the resins disclosed in Japanese Laid-open Patent Application Specification No. 17347/78, for example, rosin-modified phenol resin, terpene-modified phenol resin, cashew-modified phenol resin, etc.

The present invention will be described in detail below, referring to Examples:

Preparatory Example

Various kinds of dispersion were prepared in the following manner:

Dispersion A: prepared by milling and dispersing 150 g of 3-(N-methylcyclohexylamino)-6-methyl-7-anilinofluorane together with 150 g of 5% hydroxyethylcellulose and 200 g of water in a ball mill for 24 hours.

Dispersion B: prepared by milling and dispersing 150 g of bisphenol A together with 150 g of 5% hydroxyethylcellulose and 200 g of water in a ball mill for 24 hours.

Dispersion C: prepared by milling and dispersing 150 g of the following fatty acid amide together with 300 g of 5% hydroxyethylcellulose and 50 g of water in a ball mill for 72 hours. As the fatty acid amide, Dispersion C-1: stearic acid amide, which will be hereinafter referred to as "amide S".

Dispersion C-2: N,N'-ethylenebisstearic acid amide, which will be hereinafter referred to as "ethylenebisamide".

Dispersion C-3: N-methylolstearic acid amide, which will be hereinafter referred to as "methylol amide".

Dispersion D: prepared by milling and dispersing 150 g of water-insoluble modified phenol resin having a softening point of 80° to 190° C. together with 150 g of 5% hydroxyethylcellulose and 200 g of water in a ball mill for 24 hours.

Comparative Example 1

| | |
|---|---|
| Dispersion A | 10 g |
| Dispersion B | 50 g |
| Dispersion C-1 (dispersion of amide S) | 50 g |
| Calcium carbonate PC (made by Shiraishi Calcium K.K., Japan) | 30 g |
| 5% hydroxyethylcellulose | 252 g |

The heat-sensitive composition was prepared according to the foregoing formulation and applied to paper having a basis weight of 50 g/m$^2$ so that the amount of the color former could be 0.3 g/m$^2$ after drying. Then, the coated paper was passed through a supercalendar to prepare heat-sensitive paper having a Bekk smoothness of 200 to 250 seconds for comparison.

Comparative Example 2

| | |
|---|---|
| Dispersion A | 10 g |
| Dispersion B | 50 g |
| Dispersion C-1 | 25 g |
| Dispersion C-3 (Dispersion of methylol amide) | 25 g |
| Calcium carbonate PC | 30 g |
| 5% hydroxyethylcellulose | 252 g |

Heat-sensitive paper for comparison was prepared from a heat-sensitive composition prepared according to the foregoing formulation in the same manner as in Comparative Example 1.

Comparative Example 3

| | |
|---|---|
| Dispersion A | 10 g |
| Dispersion B | 50 g |
| Dispersion C-1 | 50 g |
| Dispersion D (Tamanol 135* used) | 15 g |
| Calcium carbonate PC | 30 g |
| 5% hydroxyethylcellulose | 258 g |

*Tamanol 135 is a trademark of water insoluble rosin-modified phenol resin having a softening point of 130° to 140° C., made by Arakawa Rinsan K.K., Japan.

Heat-sensitive paper for comparison was prepared from a heat-sensitive composition prepared according to the foregoing formulation in the same manner as in Comparative Example 1.

Comparative Example 4

| | |
|---|---|
| Dispersion A | 10 g |
| Dispersion B | 50 g |
| Dispersion C-1 | 50 g |
| Dispersion D (Tamanol 135 used) | 100 g |
| Calcium carbonate PC | 30 g |
| 5% Hydroxyethylcellulose | 372 g |

Heat-sensitive paper for comparison was prepared from a heat-sensitive composition prepared according to the foregoing formulation in the same manner as in Comparative Example 1.

Comparative Example 5

| | |
|---|---|
| Dispersion A | 10 g |
| Dispersion B | 50 g |
| Dispersion C-2 (Dispersion of ethylene bisamide) | 50 g |
| Calcium carbonate PC | 30 g |
| 5% Hydroxyethylcellulose | 252 g |

Heat-sensitive paper for comparison was prepared from a heat-sensitive composition prepared according to the foregoing formulation in the same manner as in Comparative Example 1.

EXAMPLE 1-3

| | Ex. 1 | Ex. 2 | Ex. 3 |
|---|---|---|---|
| Dispersion A | 10 g | 10 g | 10 g |
| Dispersion B | 50 g | 50 g | 50 g |
| Dispersion C-1 | 40 g | 25 g | 15 g |
| Dispersion C-3 | 10 g | 25 g | 35 g |
| Dispersion D (Tamanol 135 used) | 20 g | 10 g | 5 g |
| Calcium carbonate PC | 30 g | 30 g | 30 g |
| 5% Hydroxyethyl-cellulose | 276 g | 264 g | 258 g |

The heat-sensitive composition was prepared according to the foregoing formulation and applied to paper having a basis weight of 50 g/m$^2$ so that the amount of the color former could be 0.3 g/m$^2$ after drying. Then, the coated paper was passed through a supercalendar to prepare heat-sensitive paper having a Bekk smoothness of 200 to 250 seconds.

EXAMPLES 4-11

| | |
|---|---|
| Dispersion A | 10 g |
| Dispersion B | 50 g |
| Dispersion C-1 | 25 g |
| Dispersion C-3 | 25 g |
| Dispersion D | 10 g |
| Calcium carbonate PC | 30 g |
| 5% Hydroxyethylcellulose | 264 g |

The resin used in Dispersion D is given in the following Table.

| | Resin | Species | Melting point |
|---|---|---|---|
| Ex. 4 | Tamanol 135 | Rosin-modified phenol resin made by Arakawa Rinsan K.K., Japan | 130-140 |
| Ex. 5 | Tamanol 145 | Rosin-modified phenol resin made by Arakawa | 140-150 |

-continued

| | Resin | Species | Melting point |
|---|---|---|---|
| | | Rinsan K.K., Japan | |
| Ex. 6 | Tamanol 310 | Rosin-modified phenol resin made by Arakawa Rinsan K.K., Japan | 145–155 |
| Ex. 7 | Tamanol 350 | Rosin-modified phenol resin made by Arakawa Rinsan K.K., Japan | 170–185 |
| Ex. 8 | Hitanol 40G | Rosin-modified phenol resin made by Hitachi Kasei Kogoyo K.K., Japan | 136–145 |
| Ex. 9 | Hitanol 50G | Rosin-modified phenol resin made by Hitachi Kasei Kogyo K.K., Japan | 146–155 |
| Ex. 10 | Hitanol 260 | Rosin-modified phenol resin made by Hitachi Kasei Kogyo K.K., Japan | 156–165 |
| Ex. 11 | Sumilite resin PP-219 | Terpene-modified phenol resin | 135–140 |

Heat-sensitive paper was prepared from a heat-sensitive composition prepared according to the foregoing formulation in the same manner as in Example 1.

EXAMPLE 12

| | |
|---|---|
| Dispersion A | 10 g |
| Dispersion B | 50 g |
| Dispersion C-2 | 50 g |
| Dispersion D (Tamanol 135 used) | 5 g |
| Calcium carbonate PC | 30 g |
| 5% Hydroxyethylcellulose | 253 g |

Heat-sensitive paper was prepared from a heat-sensitive composition prepared according to the foregoing formulation in the same manner as in Example 1.

EXAMPLES 13–15 and Comparative Example 6–7

| | |
|---|---|
| Dispersion A | 10 g |
| Dispersion B | 50 g |
| Dispersion of fatty acid amide | 50 g |
| Dispersion D (Tamanol 135 used) | 25 g |
| Calcium carbonate PC | 30 g |
| 5% Hydroxyethylcellulose | 282 g |

As the dispersion of fatty acid amide, the following mixtures shown in the following Table were used.

| | Dispersion of fatty acid amide | | | |
|---|---|---|---|---|
| | Dispersion C-1 (g) | Dispersion C-3 (g) | Total (g) | Percent of dispersion C-3 (%) |
| Comp. Ex. 6 | 45 | 5 | 50 | 10 |
| Comp. Ex. 7 | 42.5 | 7.5 | " | 15 |
| Ex. 13 | 40 | 10 | " | 20 |
| Ex. 14 | 37.5 | 12.5 | " | 25 |
| Ex. 15 | 35.0 | 15 | " | 30 |

Heat-sensitive paper was prepared from a heat-sensitive composition prepared according to the foregoing formulation in the same manner as in Example 1.

EXAMPLES 16–22 and Comparative Examples 8–11

| | |
|---|---|
| Dispersion A | 10 g |
| Dispersion B | 50 g |
| Dispersion C-1 | 25 g |
| Dispersion C-3 | 25 g |

-continued

| | |
|---|---|
| Calcium carbonate PC | 30 g |
| Dispersion D | as shown in the following Table |
| 5% Hydroxyethylcellulose | |

| | Dispersion D (Tamanol 135 used) (g) | 5% Hydroxyethylcellulose (g) | Percent of Tamanol to bisphenol A (%) |
|---|---|---|---|
| Comp. Ex. 8 | 1.5 | 254 | 3 |
| Comp. Ex. 9 | 2 | 254 | 4 |
| Ex. 16 | 2.5 | 255 | 5 |
| Ex. 17 | 3 | 256 | 6 |
| Ex. 18 | 3.5 | 256 | 7 |
| Ex. 19 | 12.5 | 267 | 25 |
| Ex. 20 | 20 | 276 | 40 |
| Ex. 21 | 22.5 | 279 | 45 |
| Ex. 22 | 25 | 282 | 50 |
| Comp. Ex. 10 | 27.5 | 285 | 55 |
| Comp. Ex. 11 | 30 | 288 | 60 |

Heat-sensitive paper was prepared from a heat-sensitive composition prepared according to the foregoing formulation in the same manner as in Example 1.

The heat-sensitive paper prepared according to Comparative Examples 1–11 and the sensitive paper prepared according to Examples 1–22 were subjected to comparative tests in the following manner:

(a) Images were printed by Toshiba Fax KB-4800 to measure color formation concentration and fogging on the sheet surface. The measurement was made by means of Sakura densitometer PDA 45.

(b) Formed images were rubbed with fingers equally, and then the sheets were kept in a drier at 120° C. for one minute, and left cooling, and again kept in the same drier at the same temperature for one minute, and then the degree of powder generation was determined visually.

(c) A drop of hair oil (Vitalis V7 made by Lion Tooth Powder K.K., Japan) diluted to 1% with cyclohexane was dropped onto formed images, and the sheets were left standing overnight. Then, the residual percentage of images was measured.

The test results are shown in the following Table, where circle marks "o" show no powder generation, triangle marks "Δ" show slight powder generation, and cross marks "x" show considerable powder generation.

TABLE

| | Test (a) | | | |
|---|---|---|---|---|
| | Formed color concentration | Sheet surface concentration | (b) | (c) (%) |
| Comp. Ex. 1 | 1.14 | 0.09 | X | 18 |
| 2 | 1.11 | 0.08 | Δ | 52 |
| 3 | 1.12 | 0.08 | Δ – X | 43 |
| 4 | 1.11 | 0.07 | O – Δ | 63 |
| 5 | 1.06 | 0.08 | Δ | 58 |
| Ex. 1 | 1.13 | 0.08 | O | 88 |
| 2 | 1.11 | 0.07 | O | 92 |
| 3 | 1.10 | 0.07 | O | 89 |
| 4 | 1.13 | 0.07 | O | 91 |
| 5 | 1.12 | 0.07 | O | 90 |
| 6 | 1.11 | 0.07 | O | 88 |
| 7 | 1.11 | 0.07 | O | 89 |
| 8 | 1.12 | 0.08 | O | 88 |
| 9 | 1.11 | 0.07 | O | 93 |
| 10 | 1.13 | 0.08 | O | 90 |
| 11 | 1.10 | 0.07 | O | 91 |
| 12 | 1.04 | 0.07 | O | 89 |

TABLE-continued

| | Test (a) Formed color concentration | Sheet surface concentration | (b) | (c) (%) |
|---|---|---|---|---|
| Comp. Ex. 6 | 1.12 | 0.08 | Δ – X | 55 |
| 7 | 1.12 | 0.07 | O – Δ | 70 |
| Ex. 13 | 1.11 | 0.07 | O | 89 |
| 14 | 1.11 | 0.07 | O | 91 |
| 15 | 1.10 | 0.07 | O | 90 |
| Comp. Ex. 8 | 1.13 | 0.07 | Δ – X | 47 |
| 9 | 1.13 | 0.07 | Δ | 66 |
| Ex. 16 | 1.12 | " | O | 80 |
| 17 | 1.12 | " | O | 80 |
| 18 | 1.12 | " | O | 82 |
| Ex. 19 | 1.08 | 0.07 | O | 91 |
| 20 | 1.04 | " | O | 90 |
| 21 | 1.02 | " | O | 93 |
| 22 | 1.00 | " | O | 92 |
| Comp. Ex. 10 | 0.89 | 0.06 | O | 89 |
| 11 | 0.75 | 0.06 | O | 90 |

As is obvious from the foregoing Table, some improvement can be attained merely by using N-monosubstituted fatty acids amide at the same time, or by using the modified phenol resin (Comparative Examples 2 and 3), but it is not satisfactory. Considerable improvement can be excepted by using a large amount of the modified phenol resin (Comparative Example 4), but sticking occurs and printing noise is large, or unprinted white lines appear.

On the other hand, powder generation can be improved in the case of the heat-sensitive paper shown in Examples without impairing the whiteness of sheet surface and without considerable lowering of sensitivity. Furthermore, color fading by hair oil can be considerably prevented.

In Comparative Example 5, where ethylenebisamide is used alone as a sensitizer without any non-substituted fatty acid amide, powder generation occurs, but it can be prevented by simultaneous use of a modified phenol resin as shown in Example 12.

When less than 20% by weight of N-mono-substituted fatty acid amide is contained on the basis of total fatty acid amide, powder is considerably generated, and a satisfactory effect cannot be obtained even by using the modified phenol resin at the same time (Comparative Examples 6 and 7).

When less than 5% by weight of the modified phenol resin is used on the basis of bisphenol A, effect upon the stability of images is too small (Comparative Examples 8 and 9), whereas above 50% by weight, the effect upon the stability of images is remarkable, but decrease in the initial concentration (dilution effect) is so large due to too large an amount of modified phenol resin that the quality of heat-sensitive paper will be lowered and also facsimile, etc. will emit a larger printing noise (Comparatige Examples 10 and 11).

What is claimed is:

1. A heat-sensitive recording composition with an improved image stability which comprises 3-(N-methylcyclohexylamino)-6-methyl-7-anilinofluorane, 4,4'-isopropylidenediphenol capable of color-developing the fluorane through reaction by heating, fatty acid amide as a sensitizer, and water-insoluble modified phenol resin having a softening point of 80° to 190° C, at least 20% by weight of N-monosubstituted fatty acid amide being contained on the basis of total fatty acid amide, and 5 to 50% by weight of the water-insoluble, modified phenol resin being contained on the basis of the 4,4'-isopropylidenediphenol.

2. A heat-sensitive recording composition according to claim 1, wherein the N-monosubstituted fatty acid amide is N,N'-ethylenebisstearic acid amide, N,N'-methylenebisstearic acid amide, or N-methylolstearic acid amide.

3. A heat-sensitive recording composition according to claim 1 or 2, wherein the water-insoluble modified phenol resin is rosin-modified phenol resin.

* * * * *